Dec. 30, 1952 B. STAHMER 2,623,401
DUAL DIRECTION COUPLER
Filed March 18, 1947 2 SHEETS—SHEET 2
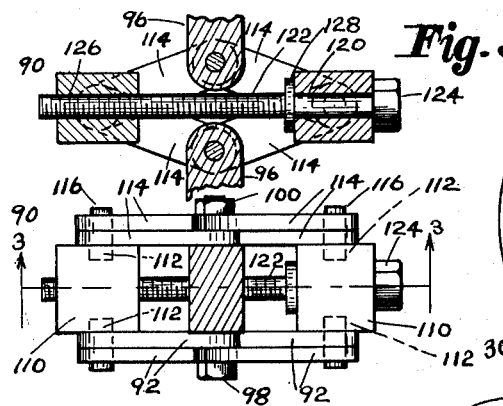
Fig. 3.
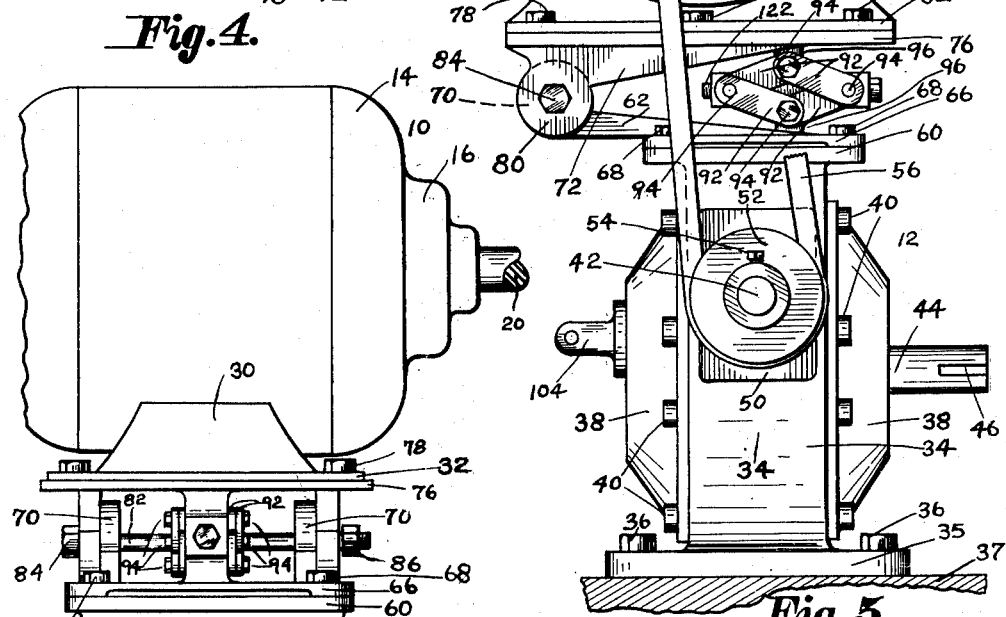
Fig. 4.
Fig. 5.
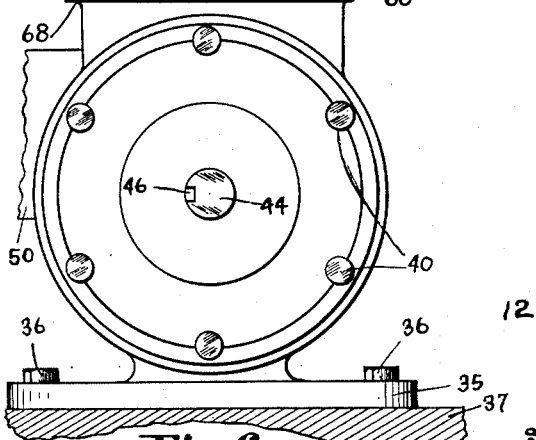
Fig. 6.
Inventor
Bernhardt Stahmer
By Arthur H. Sturges
Attorney Patented Dec. 30, 1952

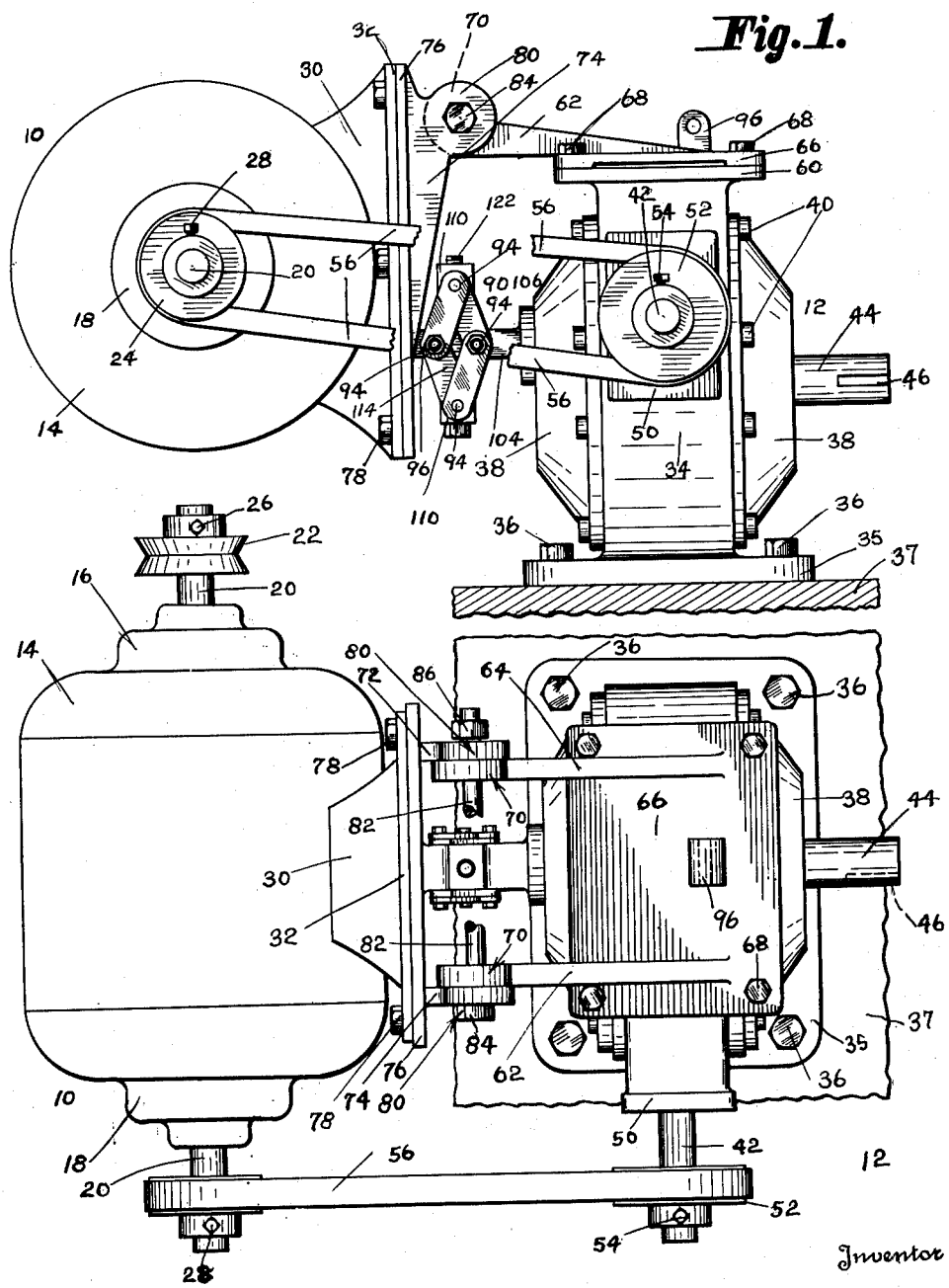

2,623,401

UNITED STATES PATENT OFFICE 2,623,401

DUAL DIRECTION COUPLER

Bernhardt Stahmer, Omaha, Nebr.

Application March 18, 1947, Serial No. 735,495

1 Claim. (Cl. 74—242.13)

This invention relates to power driven machinery and more particularly it is an object of the invention to provide a dual direction coupler for mounting a motor on the housing of a worm-gear speed reduction mechanism or the like.

Worm gear speed reduction mechanisms and motors for use therewith are frequently marketed together in an assembly, the motors being of specific sizes complemental to the gear ratio of the speed reduction mechanisms. In such assemblies, the motors are either mounted above or to the side of the speed reduction mechanisms. In order for a manufacturer of such assemblies to sell a standardized product both to customers desiring the motor mounted above the worm gear mechanism and to customers desiring the motor at one side of the mechanism, it is an object of the present invention to provide an assembly of this type in which the user may, at his option, change the position of the motor to suit his specific needs. Also, it frequently happens that in using such assemblies for different uses, the position of the motor can be changed to advantage by a single owner.

Another object of the invention is to provide a belt or sprocket chain tension regulator of specific construction for use with assemblies of the above mentioned type.

Another object of the invention is to provide a belt and sprocket chain tension regulator, as described, which will not only maintain the tension above a minimum tension requirement but will also maintain the tension below a maximum requirement.

A still further object of the invention is to provide a belt or sprocket chain tension regulator, as described, in the use of which a comparatively small amount of adjusting movement is required for causing a relatively large spacing movement for spacing apart or drawing together the pulleys or sprocket wheels at the opposite ends of a belt or chain.

Other and still further objects and advantages of the invention will become apparent from the following description of a preferred embodiment thereof.

In the drawings:

Figure 1 is a side elevation of a worm-gear speed reduction mechanism and motor assembly in a horizontal position, shown with the coupler and belt tension regulating mechanism of the invention attached thereto;

Figure 2 is a top plan view of the mechanisms of Figure 1;

Figure 3 is a detailed view in section taken along the line 3—3 of Figure 4;

Figure 4 is a detailed top plan view of the belt or sprocket chain tension regulating mechanism shown in Figure 1.

Figure 5 is a side elevation of a worm-gear speed reduction mechanism and motor assembly, the motor assembly being in a vertical position, in combination with the dual direction coupler and belt tension regulator of this invention, a portion of the driving belt being broken away; and Figure 6 is a right hand elevation of the mechanisms shown in Figure 5, a section of the motor, motor pulley, the belt, the driven pulley of the speed reduction mechanism, and a section of the worm-gear housing being broken away.

The dual direction coupler and belt or sprocket chain tension regulating mechanisms of this invention are for use in coupling a motor generally indicated at 10 to any desired driven mechanism. The latter can be a worm-gear speed reducing mechanism as shown at 12.

The motor 10 includes a housing 14, bearing plates 16 and 18 at opposite ends of the housing 14, a driving shaft 20 longitudinally disposed in the housing 14, driving pulleys 22 and 24 secured to opposite ends of the driving shaft 20 by set screws 26 and 28, respectively, a mounting flange 30 secured to the bottom of the motor 10, and a mounting platform 32 disposed in a plane in parallelism with the shaft 20.

The worm-gear speed reducing mechanisms such as the one shown at 12 normally include a housing 34 secured by means of a mounting platform 35 and bolts 36 to a work table or the like 37; bearing plates 38 at opposite sides of the housing 34 and secured thereto by suitable bolts 40; a driven shaft 42 disposed through the side of the housing 34 in parallelism with the driving shaft 20; a driven shaft 44 disposed through the housing 34 at a right angle to and below the driven shaft 42, the driving shaft 44 being provided with a key slot 46 for facilitating its attachment to other mechanisms, not shown, which it may be desired to drive at a reduced speed with respect to the speed of the motor driving shaft 20.

The driven shaft 42 is in a suitable bearing member and worm-gear housing 50 and a driven pulley 52 is normally attached to the end of the shaft 42 by means of a suitable set screw 54. The driving pulley 22 and the driven pulley 52 are normally interconnected by a suitable driving belt 56. If desired, sprocket wheels may be substituted for the pulleys 22 and 52 and a sprocket chain may be used in place of the belt 56.

In accordance with the present invention, a platform 60 is provided extending in a horizontal plane and attached to the top of the worm-gear mechanism housing 34. If desired, the platform 60 may be cast integrally with the housing 34. A pair of spaced apart ears or lugs 62 and 64 are secured to the top of the platform 60. The ears 62 are preferably disposed in parallelism and extend outwardly to one side of the housing 34, as shown in Figure 5. The ears 62 and 64 are preferably each secured to a mounting or base plate 66 in a manner whereby the plate 66 is disposed in parallelism with the platform 60 and disposed directly there above. Any suitable bolts 68 may be used to secure the plate 66 to the platform 60. The ends of the ears 62 and 64 preferably terminate in rounded portions 70, the latter each having an aperture disposed therethrough, the apertures in the ears 62 and 64 being in axial alignment with one another.

A pair of spaced apart tabs or lugs 72 and 74 somewhat similar in construction to the ears 62 and 64 are secured to a motor mounting plate 76, the latter being disposed in parallelism with and abutting the mounting platform 32 of the motor 10, the mounting platform 32 and the mounting plate 76 being secured together by suitable bolts 78. Each of the tabs 72 and 74 are provided with rounded ends 80.

The rounded ends 80 of the tabs 72 and 74 are each provided with an aperture, the apertures being in axial alignment with each other. An elongated bolt 82 is disposed through the aligned apertures in the tabs 72 and 74 and the ears 62 and 64, the bolt 82 having a head 84 at one end thereof, the other end of the bolt 82 being threaded and provided with a nut 86. The tabs 72 and 74 and the ears 62 and 64 are so spaced and positioned with respect to the motor housing 14 and the speed reduction mechanism housing 34 that the axis of the bolt 84 is at all times disposed to one side of a line between the driving shaft 20 and the driven shaft 42, whether the motor and the speed reduction mechanism are in horizontal or vertical alignment.

As thus described, the ears 62 and 64, tabs 72 and 74 and the bolt 84 form a hinge means with portions 72 and 74, stationary with respect to the motor and other portions 62 and 64 stationary with respect to the mechanism housing.

Such hinge means is so constructed and disposed that at times when that hinge portion which is stationary with respect to the motor extends along the pivot pin 84 in one direction, the motor 10 will be disposed to the side of the mechanism 12 and on the other side of said hinge portion from said mechanism.

Also, the construction is such that when those hinge portions comprising the tabs 72 and 74, which are stationary with respect to the motor, extend along the pin 84 in a reverse direction, the motor will be disposed above said mechanism and on the other side of said hinge portion from said mechanism.

A belt stretching mechanism, generally indicated at 90, is disposed between the platforms 60 and 76 at times when the assembly is in the vertical position, as shown in Figure 5. The spacing mechanism 90 includes four arms or levers 92 arranged in a diamond-shaped configuration. Each of the ends of each of the arms 92 are in an overlapped position with respect to the adjacent end of another one of said arms, oppositely disposed ones of said arms in the diamond-shaped configuration are positioned to one side of the other two oppositely disposed ones of said arms. Each of the arms 92 is provided with an aperture in each of its overlapping ends, the apertures in any two overlapping ones of said ends being in axial alignment.

Four pivot pins 94 are disposed through the aligned apertures. Those two oppositely disposed ones of the pivot pins 94 are secured respectively by means of a pair of lugs 96 to the mounting plate 76, attached to the motor 10 and to the mounting plate 66 attached to the speed reduction mechanism housing 34 at times when the device is used in the vertical position, as shown in Figure 5.

The lugs 96 are preferably of square shape in cross section, each lug 96 having one end mounted upon the respective plates 66 and 76 and the other end of each lug 96 is preferably rounded for a purpose later described and provided with an aperture therein for the receipt of one of the pins 94. Those pins 94 which are disposed through the lugs 96 are preferably bolts having heads 98 and nuts 100. At times when the assembly is in the horizontal position shown in Figure 1, that lug 96 which is attached to the platform 76 is similarly used as at times when the assembly is in the vertical position shown in Figure 5. However, when the assembly is used, as shown in Figure 1, that lug 96 which is secured to the platform 66 is not used and instead a similar lug 104 is employed, the lug 104 being attached to the side of the speed reduction mechanism 12 and to that one of the bearing plates 38 which is positioned on the motor side of the speed reduction mechanism 12 at times when the assembly is in the horizontal position shown in Figure 1. The lug 104 is similar to the lug 96 except that the lug 104 is preferably provided with an outwardly extending flange 106, the flange 106 being secured to a bearing plate 38 of the speed reduction mechanism 12.

A pair of nuts 110 are each secured to one of those two oppositely disposed ones of said pivot pins 94 which are not connected to the lugs 96. The nuts 110 are each provided with a pair of notches 112 in opposite sides thereof and those pivot pins 94 which are not attached to the lugs 96 extend inwardly through the apertures in the ends of two of the arms 92 and are snugly received in two of the notches 112. Preferably, a second set of four arms 114, also arranged in a diamond-shaped configuration, are disposed upon the other side of the nuts 110 from the arms 92, the arms 114 being similar in every respect to the arms 92. The arms 114 are provided with similar pivot pins 116 extending through their overlapped ends and received in those notches 112 which are on the opposite sides of the nuts 110 from the arms 92. One of the nuts 102 is provided with an opening 120 therethrough extending in a direction parallel to a line drawn between those pivot pins 94 which are not attached to the lugs 96.

The opening 120 is for the purpose of receiving the non-threaded end of a bolt 122, the non-threaded end of the bolt 122 being provided with a head 124 at its end, and the latter is disposed on the outer side of that bolt 110 which is provided with a non-threaded opening 120. The other nut 110 is provided with a threaded opening 126 extending therethrough in axial alignment with the non-threaded opening 120 and the bolt 122 extends from the head 124 entirely through the opening 126. The bolt 122 is threaded from that end of the bolt 122 which is disposed in the threaded opening 126 all the way up the shank of the bolt 122 to the opening 120. The bolt 122 is provided with a stationary washer or bearing 128 at the end of its threaded portion for engagement with that nut 110 in which the non-threaded opening 120 is disposed. The washer 128 is preferably firmly secured to the shank of the bolt 122.

In operation, it will be seen that at times when the motor 10 and the speed reducing mechanism 12 are in the horizontal position shown in Figure 1, that the spacing mechanism 90 will be secured to the lugs 96 and 104 and that the tension of the belt 56 may be regulated by means of applying a wrench to the head 124 and turning the bolt 122. By turning the bolt 122 in one direction, the nuts 110 will be drawn together, thus causing those pivot pins 94 which are attached to the lugs 96 and 104 to become further spaced apart. This, in turn, will then space the lugs 96 and 104 further apart and increase the tension upon the belt 56. By similarly turning the bolt 122 in the opposite direction, the nuts 110 will be drawn apart, thus causing the lugs 96 and 104 to be drawn together and the tension of the belt 56 to decrease.

In order to switch the motor 10 from its position at the side of the speed reduction mechanism 12, it is necessary to first release the tension upon the belt 56, remove the belt 56 and then remove that pivot pin 94 which is secured to the lug 104. The bolt 84 is then removed from its position in the apertured ears 62 and 64 and the spaced apart apertured tabs 72 and 74. The motor is then turned end for end and the bolt 84 again put in position extending through the ears 62 and 64 and the tabs 72 and 74. That bolt 94 which had been attached to the lug 104 is then inserted through the lug 96. The belt 56 is again replaced upon the driven pulley wheel 52 and is now placed upon the other driving pulley wheel 22. The tension of the belt 56 is then selectively regulated by turning the bolt 122. As thus described, the assembly including the motor and the speed reduction mechanism 12 will then be ready for operation in the vertical position shown in Figure 5.

As thus described, it will be seen that the belt or sprocket chain tension regulator 90 will maintain the tension of the belt 56 above any selected minimum tension requirement and will also maintain the tension of the belt 56 below any selected maximum requirement since the lugs 96 and 104 are directly connected to the tension regulator 90. It will also be seen that in the use of the tension regulator 90, a comparatively small amount of adjusting movement applied by the bolt 122 against the pins 94 will cause a much larger spacing movement applied against the bolts 94 which are attached to the lugs 96.

It will be seen that the hinged motor mounting, the belt stretching device, and lugs 96 and 104 are usable with mechanisms for other purposes than the reducing of speed. In this broad sense, the speed reducing mechanism housing can be considered a support upon which the lugs 96 and 104 of the hinge members 62 and 64 are mounted.

From the foregoing description, it is thought to be obvious that a dual direction coupler constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

In a motor driven speed reduction unit, the combination which comprises a gear housing having a mounting platform on the bottom thereof, spaced ears extended laterally from the top of the gear housing to one side thereof, a shaft having a pulley thereon extended from one end of said gear housing, a motor mounting plate having spaced lugs extended from one face thereof, a motor having a shaft with a pulley thereon extended from one end, said motor mounting plate having means bolting said motor to the face thereof opposite to the face from which the lugs extend, a belt trained over the pulleys of the gear housing and motor shafts, a bolt extended through the ears of the gear housing and lugs of the motor mounting plate hinging the motor mounting plate to the gear housing whereby the motor mounting plate is adapted to be positioned, selectively, in a plane parallel to said mounting platform in one position and in a plane perpendicular to said mounting platform in another position, a plurality of pivotally connected levers, selectively, connecting the motor mounting plate to said side of the gear housing or to the top thereof, and means actuating the said levers for adjusting the position of the motor mounting plate in relation to the gear housing.

BERNHARDT STAHMER.

REFERENCES CITED

The following references are of record in the file of this patent:

UNITED STATES PATENTS

| Number | Name | Date |
| --- | --- | --- |
| 1,249,308 | Borger et al. | Dec. 11, 1917 |
| 1,433,016 | Larsh | Oct. 24, 1922 |
| 1,456,739 | Lehman | May 29, 1923 |
| 1,911,666 | Beitz | May 30, 1933 |
| 2,043,967 | Blanchard | June 9, 1936 |

FOREIGN PATENTS

| Number | Country | Date |
| --- | --- | --- |
| 673,897 | France | Jan. 21, 1930 |